(12) United States Patent
Lan et al.

(10) Patent No.: US 10,968,930 B2
(45) Date of Patent: Apr. 6, 2021

(54) CONNECTING STRUCTURE

(71) Applicant: SYNCMOLD ENTERPRISE CORP., New Taipei (TW)

(72) Inventors: Kang-Chen Lan, New Taipei (TW); Cheng-Chieh Hung, New Taipei (TW)

(73) Assignee: Syncmold Enterprise Corp., New Taipei (TW)

( * ) Notice: Subject to any disclaimer, the term of this patent is extended or adjusted under 35 U.S.C. 154(b) by 338 days.

(21) Appl. No.: 16/198,441

(22) Filed: Nov. 21, 2018

(65) Prior Publication Data
US 2019/0293098 A1 Sep. 26, 2019

Related U.S. Application Data

(60) Provisional application No. 62/646,599, filed on Mar. 22, 2018.

(30) Foreign Application Priority Data

Aug. 9, 2018 (TW) .................................. 107210927

(51) Int. Cl.
F16B 5/02 (2006.01)
(52) U.S. Cl.
CPC ..................................... F16B 5/02 (2013.01)

(58) Field of Classification Search
CPC ........ F16M 11/06; F16M 11/08; F16M 11/12; Y10T 403/34; Y10T 403/44; Y10T 403/341; Y10T 403/342; Y10T 403/344; Y10T 403/347; Y10T 403/32975; Y10T 403/32606; Y10T 403/32861; Y10T 403/32983
See application file for complete search history.

(56) References Cited

U.S. PATENT DOCUMENTS 5,088,852 A * 2/1992 Davister ............... E04B 1/1906
403/143

* cited by examiner

Primary Examiner — Alexander S Thomas
(74) Attorney, Agent, or Firm — Muncy, Geissler, Olds & Lowe, P.C.

(57) ABSTRACT

A connecting structure comprising a main body, a plurality of rotary discs, and a joint set is provided. The rotary discs are rotatably disposed on the main body with intervals. The joint set comprises at least one third connecting element and at least one fourth connecting element. The fourth connecting element matches with the first connecting of the object for connecting to each other, and the third connecting element matches with the second connecting element of the device for connecting to each other.

11 Claims, 7 Drawing Sheets

CONNECTING STRUCTURE

CROSS REFERENCE TO RELATED APPLICATION

This application claims the benefit of U.S. Provisional Application Ser. No. 62/646,599 filed on Mar. 22, 2018, and the benefit of Taiwan Patent Application Serial No. 107210927 filed on Aug. 9, 2018. The entirety of each said application is incorporated herein by reference.

BACKGROUND OF THE INVENTION

1. Field of the Invention

The present invention relates to a connecting structure, more particularly, to a connecting structure for connecting a plurality of devices onto an object.

2. Description of Related Art

Nowadays, outdoor recreations, such as cycling, running, bungee jumping and skateboarding, become more and more popular. It is also getting popular for users to record the exercising processes as well as the views of the environment through photographing or video recording. The contents may be uploaded to the public platform to be shared with others, and some of the videos are even shared in the manner of the live stream. Therefore, the peripheral equipments for supporting the photography devices are required. Taking bungee jumping for example, a user may equip himself with a camera through securing the camera to the mounting device on the strap for recording the entire process of experiencing bungee-jumping. However, especially for the live stream, the user may need other devices, such as the microphone or the flash in addition to the camera. The user then needs to prepare various mounting equipment to secure the devices, which would result in increasing the complexity of doing the live stream. Furthermore, when a user is photographing a 360 degrees view of an area, multiple cameras with multiple mounting devices are required to be annularly arranged. However, it is time consuming to rearrange the equipment from one area to another, and it also increases the complexity of preparing the equipment.

SUMMARY OF THE INVENTION

In order to solve the abovementioned problems, the object of the present invention is to provide a connecting structure, which comprises a plurality of connecting elements for connecting with a plurality of components to effectively integrate various equipment required for photographing. Each of the connecting elements is rotatable with respect to the main body of the connecting structure along an axial direction. When an additional rod body is attached to the connecting element, the elements would be able to rotate with respect to the rod body along another axial, thereby effectively extending the range of photography.

The connecting structure of the present invention is utilized to dispose at least one device onto an object. The object comprises a first connecting element, and the device comprises a second connecting element. In one embodiment, the connecting structure comprises a main body, a plurality of rotary discs, and a joint set. The surface of the main body includes a plurality of areas, and each of the areas has an axis passing therethrough. Each of the rotary discs is rotatably disposed on each of the areas correspondingly, wherein each of the rotary discs has a top surface. The axis is defined in being perpendicular to the top surface and passing through the center of the top surface, wherein each of the rotary discs is able to rotate about the axis. The joint set is utilized to connect the object and the device. The joint set comprises at least one third connecting element and at least one fourth connecting element, wherein one of the at least one third connecting element or one of the at least one fourth connecting element is disposed on one of the rotary discs respectively. The fourth connecting element of the connecting structure matches with the first connecting element of the object for detachably connecting to each other, and the third connecting element of the connecting structure matches with the second connecting element of the device for detachably connecting to each other.

Each of the areas has a cavity, and each of the cavities has an opening for the rotary disc being disposed therein correspondingly. Each of the rotary discs has a disc body and a hook, wherein each of the disc bodies is disposed at each of the openings correspondingly and each of the hooks extends from each of the disc bodies along each of the axes toward each of the cavities to connect to an inner surface of the main body correspondingly so that the rotary discs are able to engage with the main body.

Each the cavity has a large diameter section and a small diameter section which extends from the large diameter section and connects to each the opening correspondingly. Each the hook has a hooking portion and an extending portion, wherein each the hooking portion is disposed in each the large diameter portion and engages with each the inner surface of the main body correspondingly, and each the extending portion is accommodated in each the small diameter section correspondingly.

The axes all pass through a center point of the main body. The total number of the third connecting elements and the fourth connecting elements is equal to the number of the rotary discs.

Preferably, the number of the third connecting elements is three, whereas the rotary discs which correspond to the third connecting elements are disposed on the main body with intervals. The number of the fourth connecting elements is two, whereas the rotary discs which correspond to the fourth connecting elements are disposed at the two opposite ends of the main body.

The third connecting element has a plurality of connecting plates and a locking rod, and the fourth connecting element has a plurality of connecting plates. Each the connecting plate extends from each the top surface along each the axis away from the main body correspondingly.

The number of the connecting plates of the third connecting element is three. The connecting plates are correspondingly disposed on the rotary discs with intervals. The number of the connecting plates of the fourth connecting element is two. The connecting plates are correspondingly disposed on the rotary discs with intervals.

Each of the connecting plates has a hole. The holes of the connecting plates of the same third connecting element are penetrated by a central axis. The holes of the connecting plates of the same fourth connecting element are penetrated by another central axis.

The locking rod has a rod body and a nut being disposed on one side of one of the connecting plates of the third connecting element. The rod body is able to pass through the holes and be screwed with the nut when the connecting structure is connected to the object so that the connecting structure is able to pivot with respect to the object along the central axis. In addition, the rod body is able to pass through the holes and be screwed with the nut when the connecting structure is connected to the device so that the device can pivot with respect to the connecting structure along the central axis.

The first connecting elements and the third connecting elements are protrusions, and the second connecting elements and the fourth connecting elements are recesses, wherein the protrusions match and engage with the corresponding recesses.

The first connecting elements and the third connecting elements are screws, and the second connecting elements and the fourth connecting elements are screw holes. The screws match and are screwed with the corresponding screw holes.

Other objects, advantages, and novel features of the invention will become more apparent from the following detailed description when taken in conjunction with the accompanying drawings.

DETAILED DESCRIPTION OF THE PREFERRED EMBODIMENT

Figure 1:
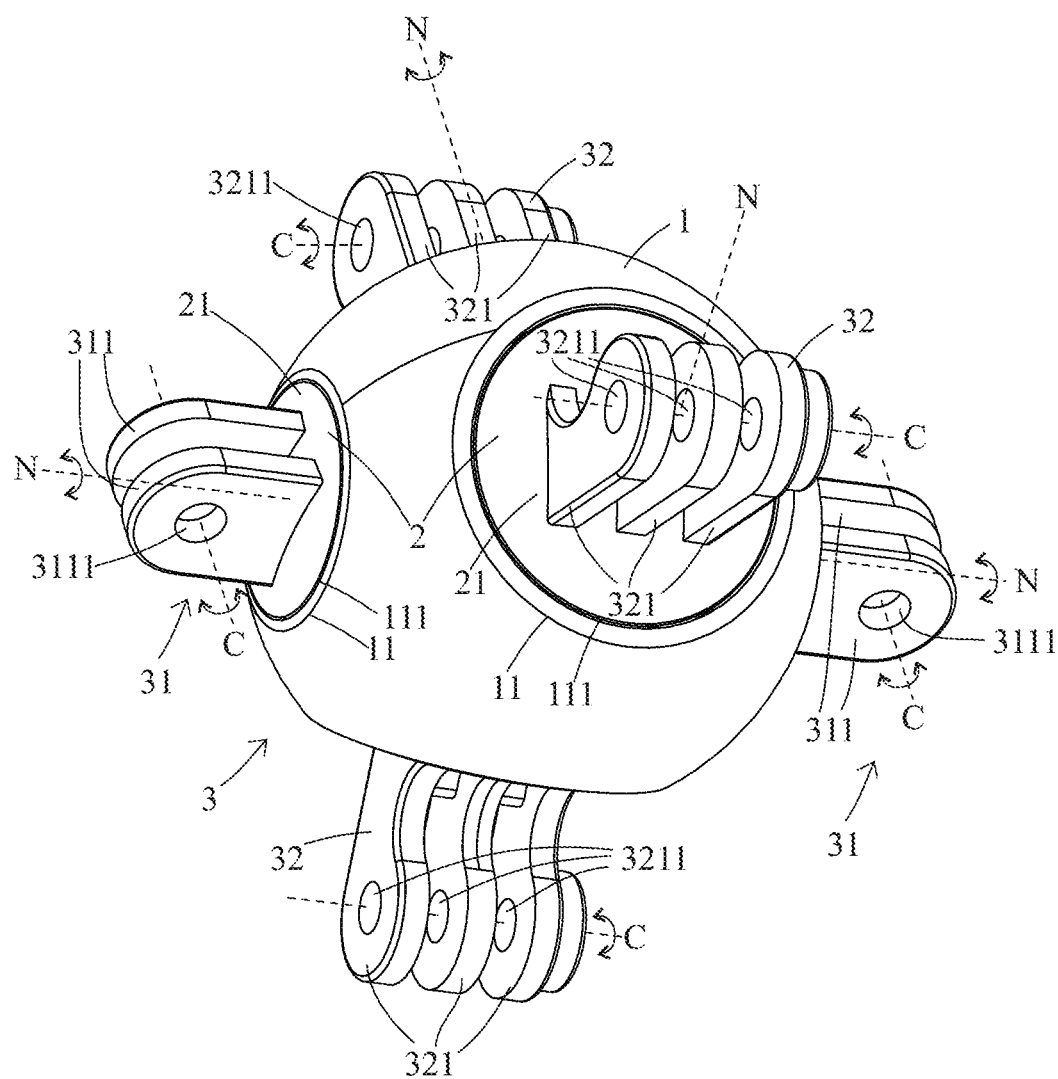
FIG. 1 is a perspective view of the connecting structure of present invention.
Figure 2:
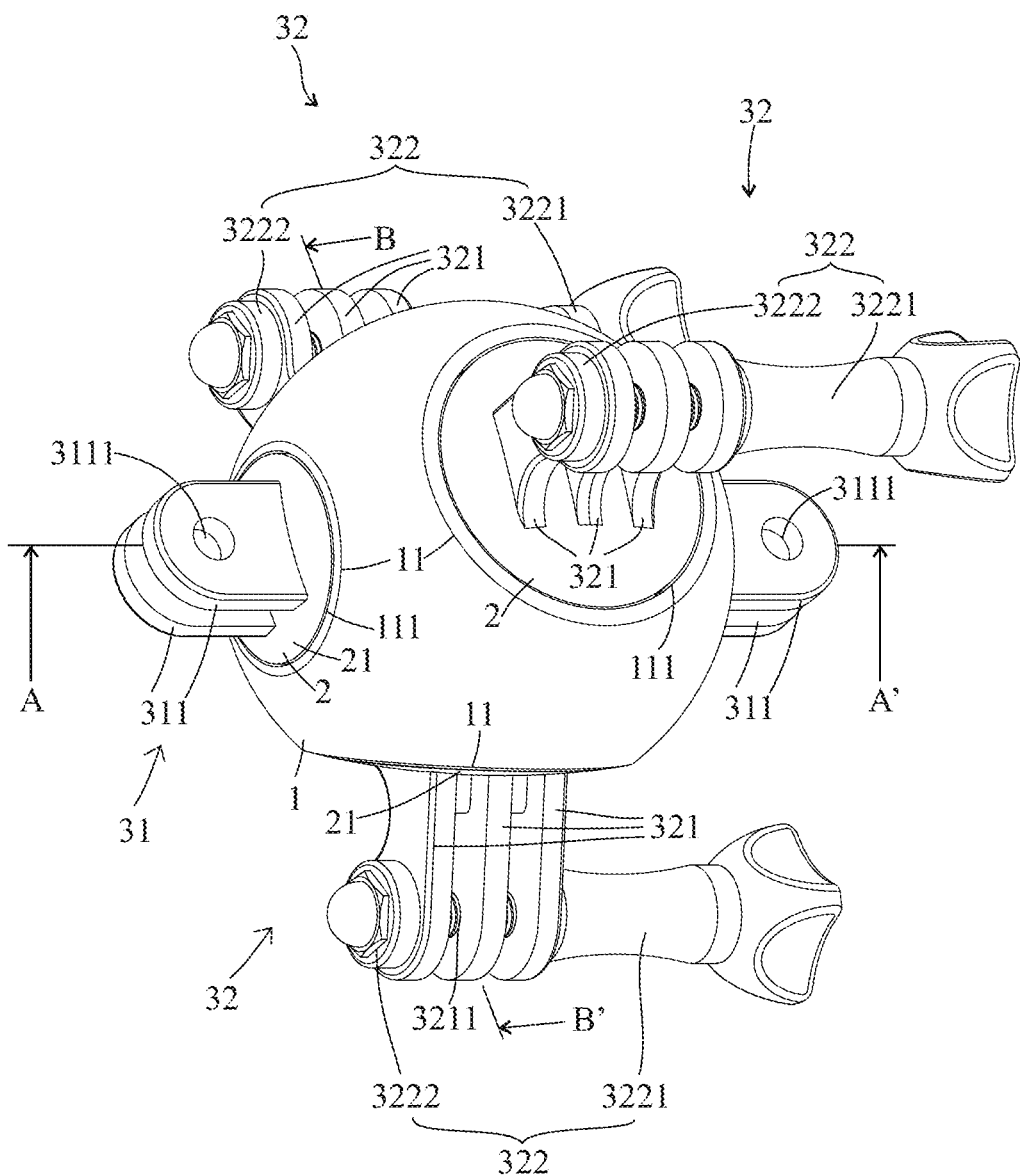
FIG. 2 is another perspective view of the connecting structure of the present invention.

As shown in FIG. 1 and FIG. 2, the connecting structure 1000 of the present invention comprises a main body 1, a plurality of rotary discs 2, and a joint set 3. The rotary discs 2 are rotatably disposed on the main body 1. The elements of the joint set 3 are correspondingly disposed on the rotary discs 2. The detailed structure and the connection of the components will be disclosed hereinafter.

Figure 3:
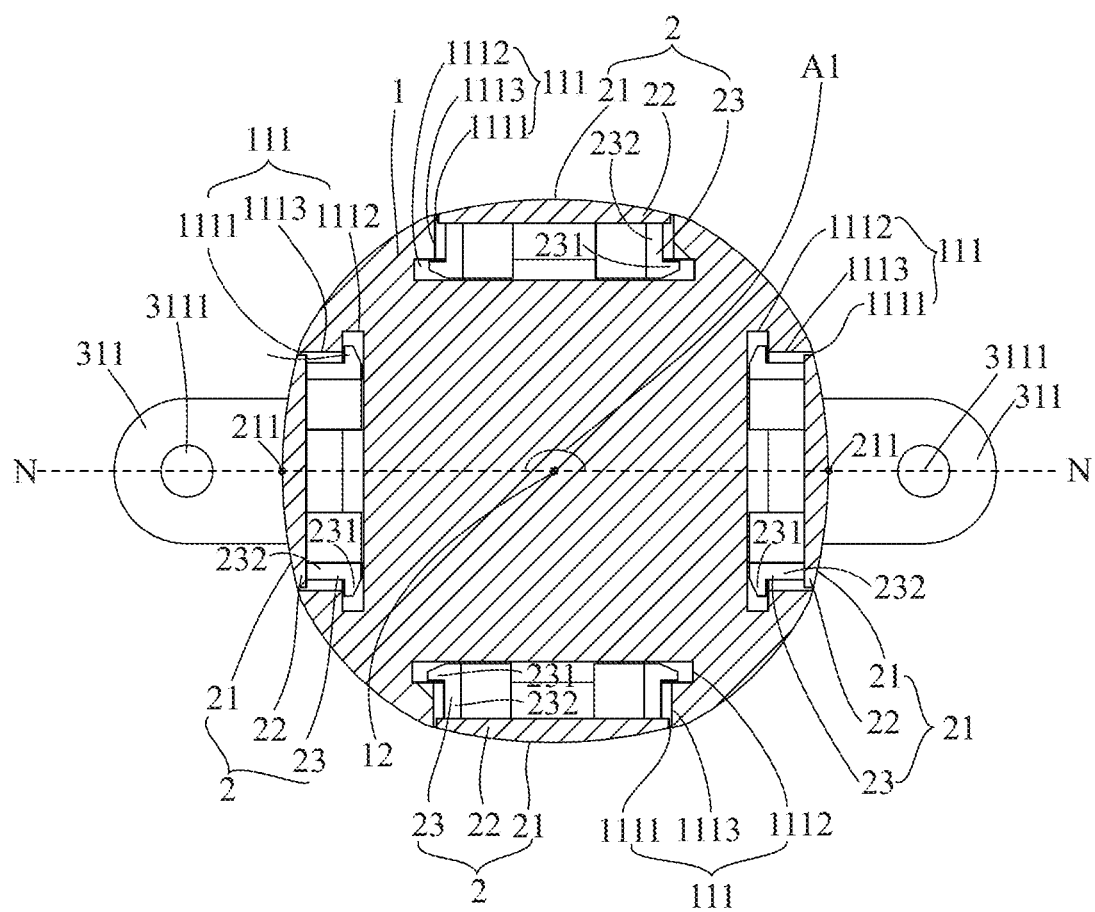
FIG. 3 is a partial cross-sectional view in accordance with the A-A' line of FIG. 2.
Figure 4:
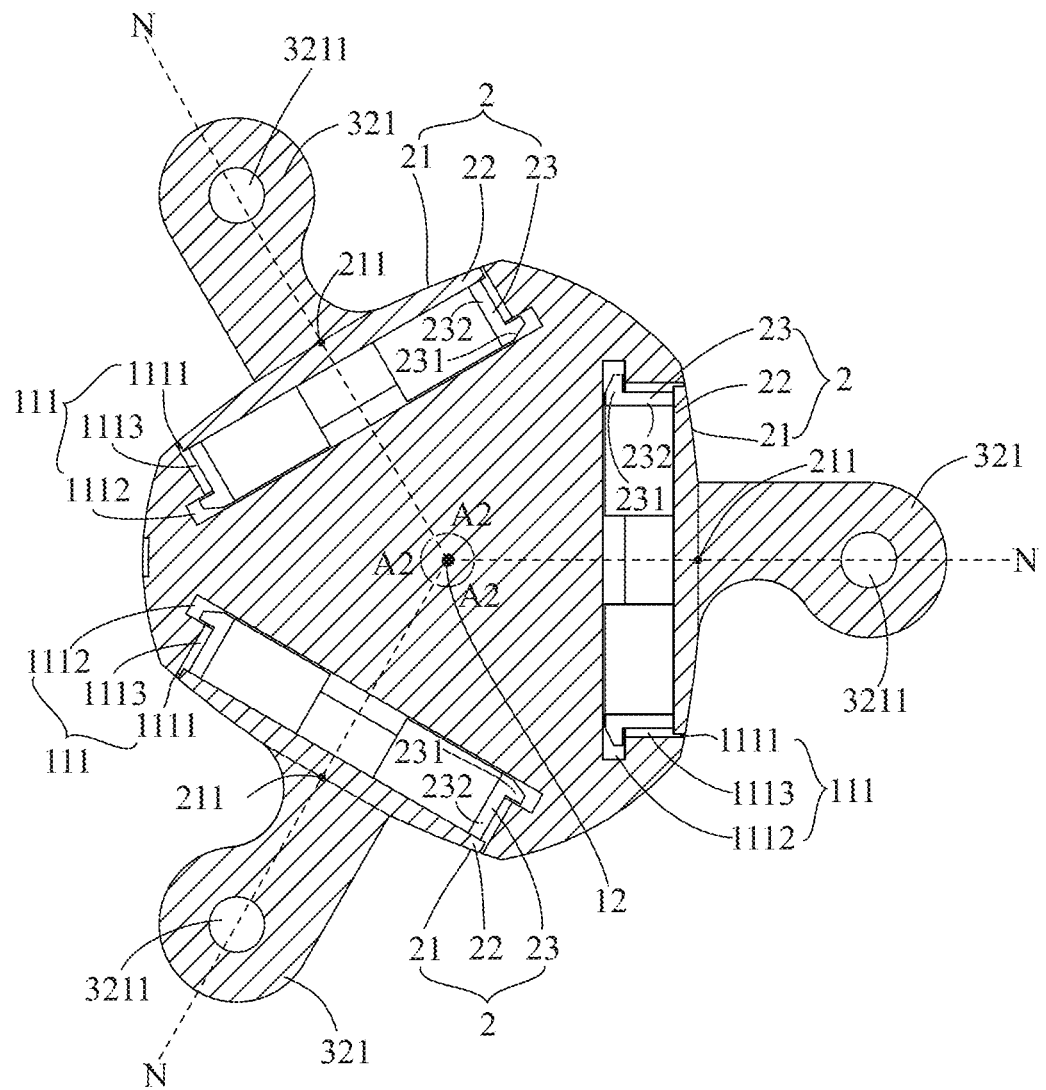
FIG. 4 is a partial cross-sectional view in accordance with the B-B' line of FIG. 2.

The main body 1 is approximately spheroid-shaped. The main body 1 is formed with a plurality of areas 11. Each of the areas 11 has an axis N passing therethrough. The axes N, which extend to different axial directions respectively, all pass through a center point 12 of the main body 1 (as shown in FIG. 3 and FIG. 4). Each of the areas 11 has a cavity 111. As shown in the cross-sectional views of FIG. 3 and FIG. 4, the cavity 111 has a T-shaped cross-section. The cavity 111 has an opening 1111, a large diameter section 1112, and a small diameter section 1113, wherein the small diameter section 1113 extends from the large diameter section 1112 and connects to the opening 1111.

Each of the rotary discs 2 is rotatably disposed in each of the cavities 111 of the areas 11 correspondingly. Each of the rotary discs 2 has a top surface 21, a disc body 22, and a hook 23. The axis N perpendicularly passes through a center 211 of the top surface 21 (as shown in FIG. 3 and FIG. 4). The disc body 22 is disposed at the opening 1111 of the cavity 111. The top surface 21 is formed on one side of the disc body 22 and faces the opening 1111. The hook 23 is ringlike and has a hooking portion 231 and an extending portion 232, wherein the extending portion 232 is formed on the other side of the disc body 22 and extends from the disc body 22 along the axis N toward the large diameter section 1112 of the cavity 111. The hooking portion 231 is formed on an end of the extending portion 232 away from the disc body 22 so that the extending portion 232 is accommodated in the small diameter section 1113, and the hooking portion 231 is disposed in the large diameter portion 1112 to engage with an inner surface of the main body 1. Referring to FIG. 3, by virtue of matching between the rotary disc 2 and the cavity 111, the rotary disc 2 is accommodated in the cavity 111 and keeps from detaching out of the main body 1. Each of the rotary discs 2 is able to rotate independently about the relative corresponding axis N. However, in other embodiments, it is also acceptable that the axis N is not defined as passing through the center point 12 of the main body 1.

In view of FIG. 3, when the two rotary discs 2 are disposed at the opposite ends of the main body 1, the two axes N passing through the rotary discs 2 form a first angle A1 therebetween. In this embodiment, the first angle A1 is 180 degrees. In view of FIG. 4, when the three rotary discs 2 are disposed on the main body 1 with same intervals from one another, any two of the three axes N passing through the rotary discs 2 form a second angle A2 therebetween. In this embodiment, the second angle A2 is 120 degrees. However, the number and the positions of the rotary discs 2 are not limited and can be adjusted according to requirements.

The joint set 3 comprises two fourth connecting elements 31 and three third connecting elements 32. The fourth connecting elements 31 are correspondingly disposed on the rotary discs 2 at the opposite ends of the main body 1 (as shown in FIG. 3). The third connecting elements 32 are correspondingly disposed on three of the rotary discs 2 which are spaced from one another with same intervals (as shown in FIG. 4). In this embodiment, referring to FIG. 2 and FIG. 3, each of the fourth connecting elements 31 has two connecting plates 311. The connecting plates 311 are distantly disposed on the top surface 21 and extend along the axis N away from the main body 1. Each of the connecting plates 311 has a hole 3111. Those holes 3111 of the connecting plates 311 of the same fourth connecting element 31 are penetrated by a central axis C. The central axis C is perpendicular to the axis N. Because each of the fourth connecting elements 31 is disposed on each of the rotary discs 2 correspondingly, when each of the rotary discs 2 rotates with respect to the main body 1 about the axis N, the fourth connecting element 31 is driven to rotate with respect to the main body 1 about the axis N.

In this embodiment, referring to FIG. 2 and FIG. 4, each of the third connecting elements 32 has three connecting plates 321 and a locking rod 322. The connecting plates 321 are disposed on the top surfaces 21 with intervals and extend along the axis N away from the main body 1. Each of the connecting plates 321 has a hole 3211. Those holes 3211 of the connecting plates 321 of the same third connecting element 32 are penetrated by another central axis C, and the central axis C is perpendicular to the axis N. The locking rod 322 has a rod body 3221 and a nut 3222. The nut 3222 is internally threaded and disposed on a side of the connecting plate 321. The rod body 3221 is able to pass through the holes 3211 and be screwed with the nut 3222. Because each of the third connecting elements 32 is disposed on each of the rotary discs 2, when each of the rotary discs 2 rotates with respect to the main body 1 about the axis N, the third connecting element 32 is driven to rotate with respect to the main body 1 about the axis N.

Since the rotary discs 2 are respectively disposed on the distinct areas 11 with different axial directions (as shown in FIG. 1 and FIG. 2), as well as the fourth connecting elements 31 and the third connecting elements 32 extend in different axial directions respectively, other devices (such as clamping members, mobile phones, and etc.) are capable of being mounted onto the connecting structure 1000 and further disposed onto an object (such as a stand, a bicycle, and etc.) in various axial directions.

In this embodiment, the total number of the third connecting elements 32 (there are three third connecting elements in this embodiment) and the fourth connecting elements 31 (there are two fourth connecting elements in this embodiment) is equal to the number of the rotary discs 2 (there are five rotary discs in this embodiment).

Figure 5:
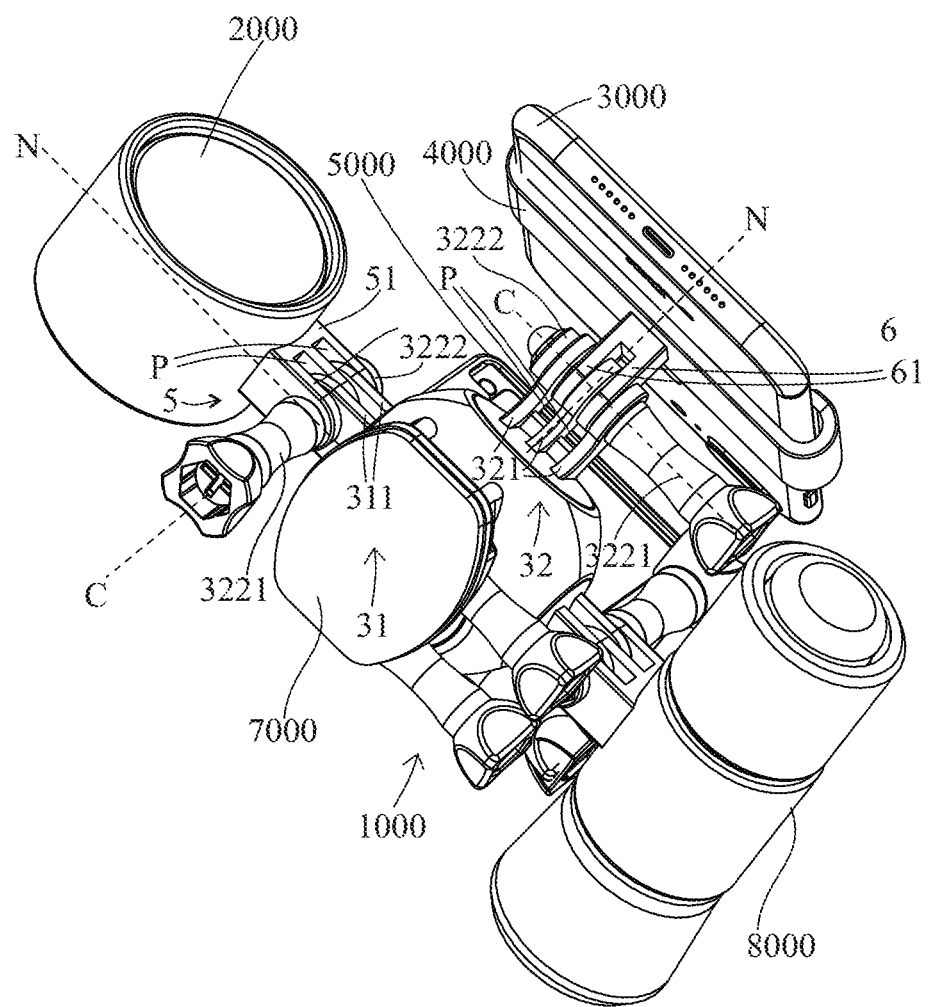
FIG. 5 is an operational view of the connecting structure of the present invention.

For example, as shown in FIG. 5, a microphone 2000, a flashlight 8000, a suction disc 7000, a mobile phone 3000, and a camera are connected to the third connecting elements 32 or the fourth connecting elements 31 of the connecting structure 1000 through a first connecting element or a second connecting element respectively. Taking the microphone 2000 as an example, the microphone 2000 has a first connecting element 5, which substantially equals to the abovementioned third connecting elements 32 and has three connecting plates 51 spaced apart with intervals. The connecting plates 51 collectively define two gaps P for the connecting plates 311 of the fourth connecting element 31 of the connecting structure 1000 being inserted correspondingly. The holes 3111 of the connecting plates 311 and the holes of the connecting plates 51 of the first connecting element 5 of the microphone 2000 are aligned for the rod body 3221 passing through to be screwed with the nut 3222. Thereby, the microphone 2000 is connected to the fourth connecting elements 31, and is able to rotate along with the fourth connecting elements 31 with respect to the main body 1 about the axis N. Alternatively, the microphone 2000 is able to rotate with respect to the fourth connecting elements 31 about the central axis C. Hence, the microphone 2000 is capable of rotating in two different axial directions. The user can easily adjust the position of the microphone 2000 with respect to the connecting structure 1000 according to the audio source.

Moreover, taking the mobile phone 3000 as an example, the mobile phone 3000 is clamped on a clamping member 4000. The clamping member 4000 has a second connecting element 6, which substantially equals to the abovementioned fourth connecting elements 31 has two connecting plates 61 spaced apart from each other with an interval. The connecting plates 321 of the third connecting elements 32 of the connecting structure 1000 form two gaps P for the connecting plates 61 of the clamping member 4000 being inserted correspondingly. The holes 3211 of the connecting plates 321 and the holes of the second connecting element 6 of the clamping member 4000 are aligned for the rod body 3221 passing through to be screwed with the nut 3222. The mobile phone 3000 can be connected to the third connecting elements 32 through the clamping member 4000. Similarly, the mobile phone 3000, the clamping member 4000, and the third connecting elements 32 are able to rotate with respect to the main body 1 about the axis N; alternatively, the mobile phone 3000 is able to rotate with respect to the third connecting elements 32 about the central axis C. The user can rotate the mobile phone 3000 in two different axial directions, so as to adjust the position of the mobile phone 3000 with respect to the connecting structure 1000 according to the viewing angle.

Figure 6:
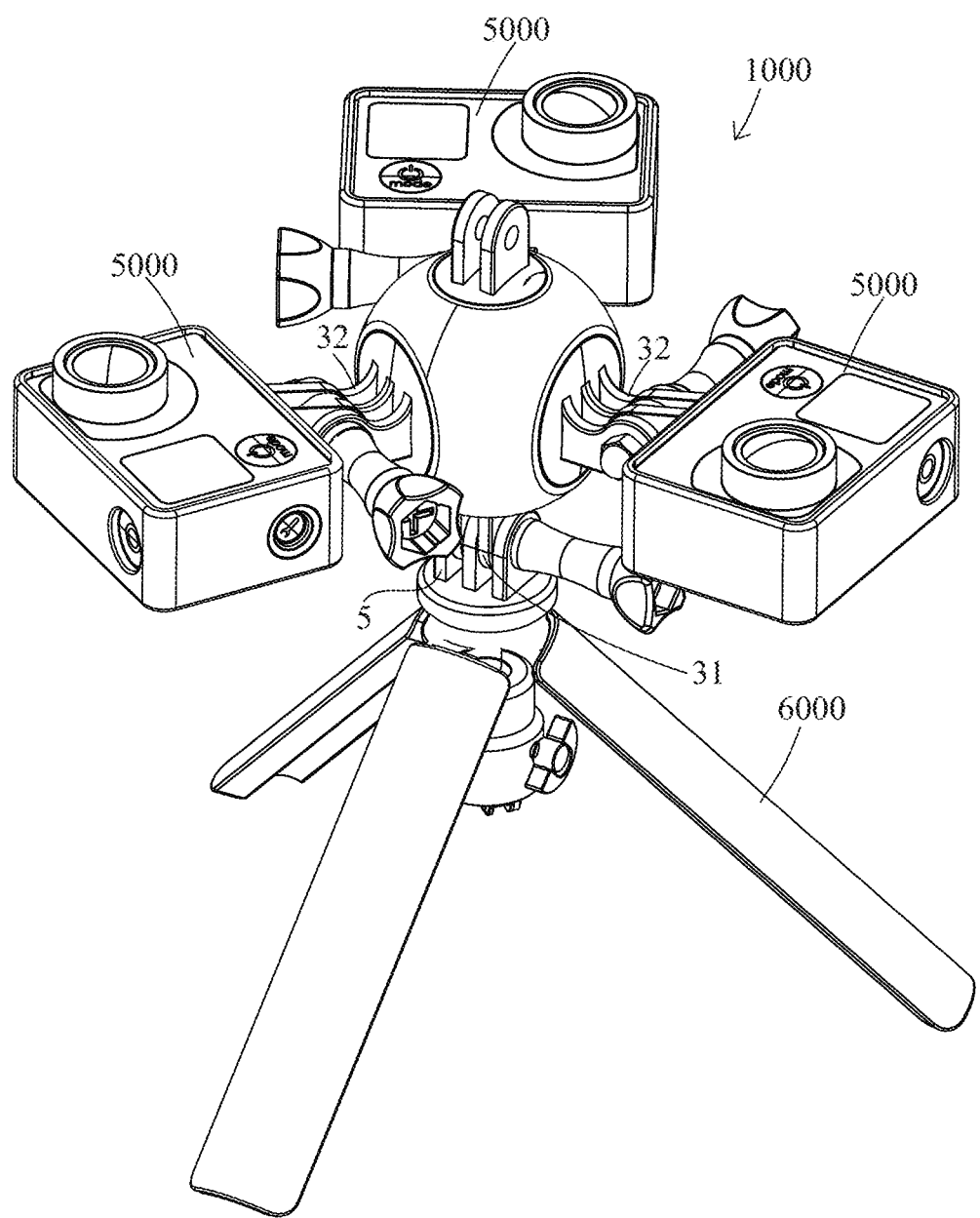
FIG. 6 is another operational view of the connecting structure of the present invention.

As shown in FIG. 6, the connecting structure 1000 is connected to three cameras 5000 and one stand 6000. Each camera 5000 comprises the second connecting element 6 correspondingly connecting to the third connecting element 32. The first connecting element 5 of the stand 6000 is connected to one of the fourth connecting elements 31. When the stand 6000 is placed on the ground, the camera 5000 is able to rotate with respect to the main body 1 and then further rotate with respect to the third connecting element 32 to face upwardly. Thus, the cameras 5000 are able to be arranged annularly. The user can adjust the positions of the cameras 5000 with respect to the connecting structure 1000 according to the requirements.

Figure 7:
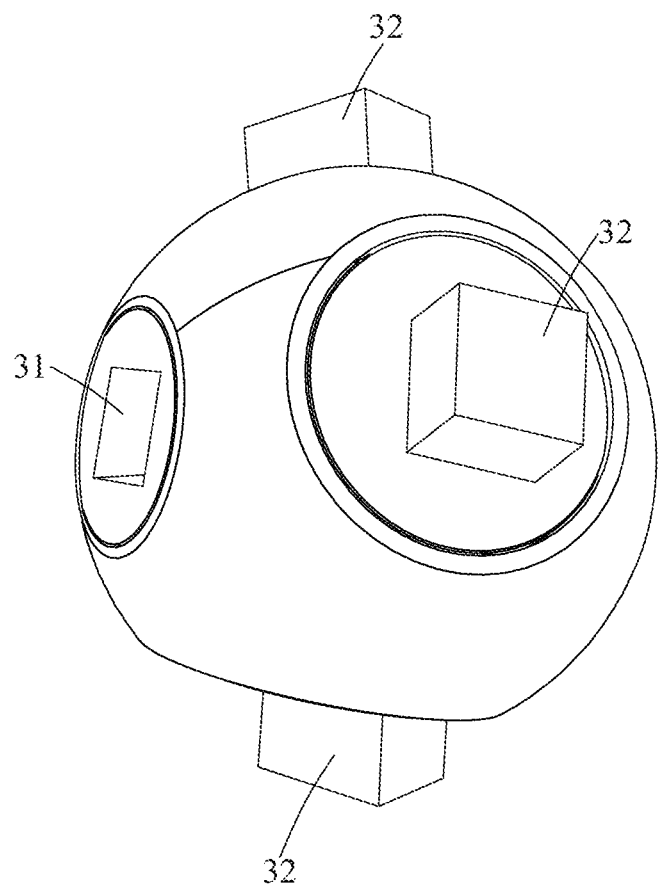
FIG. 7 is a perspective view of another embodiment of the connecting structure of the present invention.

In other embodiments, the third connecting elements 32 of the joint set 1 are protrusions, and the fourth connecting elements 31 are recesses (as shown in FIG. 7). The second connecting element 6 of the device can be a recess (not shown), and the first connecting element 5 of the object can be a protrusion (not shown). Thus, the third connecting element 32 is able to correspondingly match and engage with the second connecting element 6, and the fourth connecting element 31 is able to correspondingly match and engage with the first connecting element 5. In other embodiments, the third connecting element 32 and the first connecting element 5 are both screws (not shown), and the fourth connecting element 31 and the second connecting element 6 are both screw holes (not shown). Thus, the third connecting element 32 is adapted to correspondingly match and be screwed with the second connecting element 6, and the fourth connecting elements 31 is adapted to correspondingly match and be screwed with the first connecting element 5.

It should be noted that the third connecting elements 32 and the fourth connecting elements 31 are not limited to the aforementioned types. The structure or the number of connecting elements in the joint set of the present invention can be adjusted according to the shape of the connecting elements. The connecting elements may have similar shapes for being combined with each other. For example, the connecting elements can be planar and contain magnetic structures for magnetically attaching to each other.

In summary, the connecting structure of the present invention comprises the connecting elements in a plurality of axial directions, and the connecting elements can rotate with respect to the main body, and the shafts can rotate with respect to the connecting elements. Thus, the plurality of accessories can not only be integrated on the connecting structure, but also be rotated with respect to the main body or the connecting element, so as to meet the requirements of the users.

The above examples are intended for illustrating the embodiments of the subject invention and the technical features thereof, but not for restricting the scope of protection of the subject invention. Many other possible modifications and variations can be made without departing from the spirit and scope of the invention as hereinafter claimed. The scope of the subject invention is based on the claims as appended.

What is claimed is:

1. A connecting structure, for disposing at least one device onto an object, the object comprising a first connecting element, the device comprising a second connecting element, the connecting structure comprising:

a main body, being formed with a plurality of areas, each of the areas having a cavity and an axis passing therethrough, and each of the cavities having an opening;

a plurality of rotary discs, each of the rotary discs being rotatably disposed in each of the cavities correspondingly, wherein each of the rotary discs has a top surface, a disc body and a hook, and the axis perpendicularly passes through a center of the top surface, wherein each of the rotary discs is able to rotate about the axis, each of the disc bodies is disposed at each of the openings correspondingly and each of the hooks extends from each of the disc bodies along each of the axes toward each of the cavities to connect to an inner surface of the main body correspondingly, so that the rotary discs are able to engage with the main body; and a joint set, for connecting the object and the device, the joint set comprising at least one third connecting element and at least one fourth connecting element, wherein one of the at least one third connecting element or one of the at least one fourth connecting element is disposed on one of the rotary discs respectively;

wherein the fourth connecting element of the connecting structure matches with the first connecting element of the object for detachably connecting to each other, and the third connecting element of the connecting structure matches with the second connecting element of the device for detachably connecting to each other.

2. The connecting structure of claim 1, wherein each the cavity has a large diameter section and a small diameter section extending from the large diameter section and connecting to each the opening correspondingly, and each the hook has a hooking portion and an extending portion, wherein each the hooking portion is disposed in each the large diameter portion and engages with each the inner surface of the main body correspondingly, and each the extending portion is accommodated in each the small diameter section correspondingly.

3. The connecting structure of claim 2, wherein the axes all pass through a center point of the main body.

4. The connecting structure of claim 3, wherein the sum of the number of the third connecting elements and the number of the fourth connecting elements is equal to the number of the rotary discs.

5. The connecting structure of claim 4, wherein the number of the third connecting elements is three, and the rotary discs which are corresponding to the third connecting elements are disposed on the main body with intervals, and the number of the fourth connecting elements is two, and the rotary discs which are corresponding to the fourth connecting elements are disposed at opposite ends of the main body.

6. The connecting structure of claim 5, wherein the third connecting element has a plurality of connecting plates and a locking rod, and the fourth connecting element has a plurality of connecting plates, wherein each the connecting plate extends from each the top surface along each the axis away from the main body correspondingly.

7. The connecting structure of claim 6, wherein the number of the connecting plates of the third connecting element is three in which the connecting plates are correspondingly disposed on the rotary discs with intervals, and the number of the connecting plates of the fourth connecting element is two in which the connecting plates are correspondingly disposed on the rotary discs with interval.

8. The connecting structure of claim 7, wherein each of the connecting plates has a hole, the holes of the connecting plates of the same third connecting element are penetrated by a central axis, and the holes of the connecting plates of the same fourth connecting element are penetrated by another central axis.

9. The connecting structure of claim 8, wherein the locking rod has a rod body and a nut being disposed on one side of one of the connecting plates of the third connecting element, wherein the rod body is able to pass through the holes and be screwed with the nut when the connecting structure is connected to the object so that the connecting structure is able to pivot with respect to the object along the central axis, and the rod body is able to pass through the holes and be screwed with the nut when the connecting structure is connected to the device so that the device can pivot with respect to the connecting structure along the central axis.

10. The connecting structure of claim 1, wherein the first connecting elements and the third connecting elements are protrusions, and the second connecting elements and the fourth connecting elements are recesses, wherein the protrusions match and engage with the corresponding recesses.

11. The connecting structure of claim 1, wherein the first connecting elements and the third connecting elements are screws, and the second connecting elements and the fourth connecting elements are screw holes, wherein the screws match and are screwed with the corresponding screw holes.

* * * * *